United States Patent [19]

Strickman et al.

[11] 4,042,543

[45] Aug. 16, 1977

[54] MATERIAL FOR STOPPERS

[76] Inventors: Robert L. Strickman, 729 Handwerg Drive, River Vale, N.J. 07675; Melvyn B. Strickman, Academy St., Shiloh, N.J. 08353

[21] Appl. No.: 658,019

[22] Filed: Feb. 13, 1976

[51] Int. Cl.$^2$ .............................................. C08L 5/00
[52] U.S. Cl. .............................. 260/17.4 R; 215/355; 215/364
[58] Field of Search ................... 260/17.4 R; 215/364, 215/355

[56] References Cited

U.S. PATENT DOCUMENTS

| | | | |
|---|---|---|---|
| 2,463,952 | 3/1949 | Cooke | 260/17.4 R |
| 2,549,404 | 4/1951 | Williams | 215/364 |
| 3,406,127 | 10/1968 | Alexander | 260/17.4 R |
| 3,549,472 | 12/1970 | King et al. | 260/9 |

OTHER PUBLICATIONS

Chem. Absts.: vol. 40: 500$^8$, "Cork-like Products from Polymers of Ethylene", Aldersor, Jr.

*Primary Examiner*—Edward M. Woodberry
*Attorney, Agent, or Firm*—Charles E. Baxley

[57] ABSTRACT

A material containing from 0.1 to 10 parts of polyethylene or ethylene vinyl acetate copolymer per 1 part of natural cork is provided as a substitute for natural cork in stoppers for liquid food or wine bottles.

15 Claims, No Drawings

MATERIAL FOR STOPPERS

BACKGROUND OF INVENTION

This invention relates to stoppers for bottles, for example wine bottles. It particularly relates to a cork - polymer composition stoppers of such composition and to methods for preparing such stoppers.

Natural cork is the material most commonly used as stoppers for example in wine bottles. The material has many desirable properties making it useful as a stopper or closure. The closure seals the liquid inside the bottle and keeps air from entering the bottle and coming into contact with the wine. In standard wine bottling practice the cork is mechanically pressed into the neck of the bottle, and the resulting pressure from the outer surface of the cork and the inner wall surface of a glass bottle insures a leak proof, air tight seal which ideally should remain for several years or indefinitely. The properties of cork are based on its structure, a mass of nearly isodiametric, impervious, air filled cells, containing as much as 35% fatty acid; each a water tight, flexible compartment. When cork is cut, the cut surface is composed of a number of closely packed half-spheres, each acting like a rubber suction cut. These cells also act like small balloons, compressed with pressure, and tending to return to their original shape and size when the pressure is released. This makes cork very resilient. A good cork is removed easily from its bottle and is easily reinserted. In addition, natural cork is light in weight, easy to grasp, even when wet, and normally imparts very little or no flavor or odor to the food or drink kept in the stoppered bottle. Above all, cork is chemically substantially inert and is deteriorated very little or not at all by the weaker acids or bases present in food products, wines and liquors. Cork suffers practically no breakdown with age. It is tasteless, odorless and of pleasant feel and color.

There are, however, certain disadvantages in using cork stoppers. Cork is a natural material and as is to be expected from natural materials, there are variations in properties of cork. Some corks dry out or shrink more readily than others and stoppers made of such corks tend to leak. Dry cork stoppers are friable and frequently crumble on removal, especially when removed with a corkscrew. Some cork stoppers stick to the bottle and are hard to remove while others may unduly expand after removal making reinsertion difficult. Occasionally, particularly in red table wines that have been bottled for a number of years using cork stoppers, the cork may communicate an off-odor to the wine. Corkiness is a very undesirable odor, reminiscent of moldiness, and when unmistakably present is a sufficient excuse for refusing the wine in a restaurant.

A major problem in using cork for stoppers is the depletion of those trees from whose bark cork is obtained. With the continued depletion of such trees the problem is bound to increase leading to shortages in the supply and increases in the price of cork. Screw caps have in some instances replaced corks as stoppers for bottles, even those containing hard liquor, but the use of screw caps as closures for bottles containing higher-priced wines has not been accepted. Virtually all of the higher-priced, non-sparkling wines still come with corks, resulting in increased cost to the consumer. The reasons for this non-acceptance may lie in a combination of tradition, consumer psychology, and the fact that vintners are not yet convinced that caps will not corrode or loosen during long periods of aging. Besides, there is no question that a cork stoppered bottle has a better appearance, and the ceremony of drawing the cork stopper provides an indefinable something to the occasion. It thus appears that cork stoppers will not be replaced by screw caps as closures for bottles containing wine, despite the increasing shortage of cork.

It is, accordingly, an object of the present invention to provide a composition which can be readily fabricated into stoppers for bottles.

It is a further object of the present invention to provide a material for stoppers, which is not composed entirely of cork.

It is another object of the present invention to provide a material for stoppers, which has substantially all of the desirable properties of cork and substantially none of the undesirable properties.

It is still another object of the present invention to provide a material for stoppers, which may be fabricated from reclaimed cork.

It is still another object of the present invention to provide processes for the preparation of the material for stoppers.

Other objects will be apparent from the description which follows.

In accordance with the present invention there is provided a material composed of cork and a polymeric material, having substantially all of the desirable properties of natural cork and practically none of its disadvantages or undesirable properties. This material contains about 1 part of natural cork and from about 0.1 to 10 parts of a polymeric material, the parts referring to parts by weight. Preferred compositions contain about 1 part of natural cork and from about 1 to 5 parts of the polymer.

As the natural cork component any freshly obtained natural cork or recovered natural cork may be used. The cork is obtained as scrap chunks in random sizes and shapes and, if desired, may be sorted as to quality and color prior to use.

Any polymeric material which will coat the natural cork, be easily molded, have substantially no odor, and be inert to and impart no taste to the material being bottled may be used. Suitable polymeric materials are polyethylene and ethylene-vinyl acetate copolymer. There are commercially available from U.S. I. Chemicals as Microthene FN510, a microfine polyethylene powder composed of substantially spherically shaped particles having diameters ranging from about 8 to 30 microns (average less than 20 microns) and Microthene FE532, a microfine ethylene-vinyl acetate copolymer powder composed of substantially spherically shaped particles having diameters ranging from about 8 to 30 microns (average less than 20 microns). Either one of the polymers or a mixture of the polymers may be used. Although particles having diameters of about 8-30 microns are preferred, particles having diameters up to about 1000 microns may also be used.

In preparing the compositions of the present invention, the natural cork, after having first been graded according to quality and color it such grading is desired, is ground into particles of rough and random shapes and passed through sieves of such sizes to obtain particles ranging in size from 0.2 to 10 mm. Preferably, particles ranging in size from about 2 to 4 mm are used, although mixtures of different sizes may be combined.

A desired amount of the ground natural cork is thoroughly mixed with a desired amount of polymer powder, preferably substantially spherical particles of polyethylene having a diameter ranging from 8 to 30 microns, until the particles of the natural cork are substantially uniformly coated with the polymer. This is best achieved by stirring the mixture manually or mechanically with a paddle stirrer and from time to time lifting the stirred mass and letting it drop back into the vessel. The combined stirring and lifting operations permit the polymer powder to sift between the natural cork particles and coat them properly.

After the coating operation is completed, the spaces between the particles are filled with additional particles of polymer, natural cork or a mixture of polymer and natural cork. When natural cork is used as the filler, the size of the particles is preferably smaller than the size used in forming the mixture.

These operations serve to encase the natural cork in a matrix of polymer, in such a way as to allow the properties of natural cork to be expressed even though the cork is present as individual particles and not as one solid chunk. The natural resiliency of natural cork needs to function contiguously with the polymer. The polymer serves to form yet another flexible, resilient network, different from that of the natural cork particles, but able to work together with them in the total two-phase system. The size and assortment of the cork particles are chosen in accordance with ultimate size of the finished molded product. At times it is desirable to fill the interstitial gaps between the larger natural cork particles with polymer powder; in others, it is desirable to fill these gaps with a mixture of natural cork powder and polymer powder; or with mostly natural cork powder. It should be noted that two factors are at work here: (1) the polymer coating on the natural cork particles; and (2) the material filling the interstitial spaces before molding. Manipulation of these two factors, particularly the second one, determines the ultimate resiliency of the molded project, the greater the amount of polymer the greater the resiliency.

The filler material is added in amount from about 5 to 50% be weight of the mixture, and the combined weights in both the mixture and the filler will determine the ratio of the amounts of polymer and natural cork in the final composition.

The final mixture consisting of the natural cork particles coated with polymer to which has been added particles of polymer, natural cork or a mixture of polymer and cork is then placed in molds to be formed into desired sizes and shapes. The molds may be constructed of teflon, steel, steel plated with nickel, steel coated with teflon, and the like. Single cavity molds may be used for this purpose.

The mold is then heated to a temperature of about 250° to 300° C, and at this higher temperature the polymer first softens and then melts. On being so heated the mixture would expend about 25 to 50% of its original volume, but this expansion may be controlled by exerting pressure on the material. The pressure may range from about 5 to 75 pounds per square inch. This method of exerting pressure to control the expansion and consequently the volume of the material requires that enough space be provided in the chamber serving as the entrance to the mold, to allow for the expanded mixture to overflow the mold cavity. The amount of pressure exerted determines the flexibility and resiliency of the molded stopper, the greater the pressure the greater the flexibility and resiliency of the stopper.

Instead of introducing the material into the mold and then heating it, it is possible to heat the mixture in an open pot until it softens and then be poured or pushed with pressure into the mold. Once the material has been placed inside the mold pressure is applied as above.

By varying the pressure while the material is in the mold, such as, for example by reducing the pressure from its initial high, some further modifications are obtained in the properties of the stoppers. The material is kept in the mold at elevated temperatures for a period of about one half hour. Sufficient pressure is required to force the molten polymer to flow around the cork particles to achieve a distribution of the polymer in contact with the walls of the mold. This results in a smooth unbroken layer of polymer conforming to the shape of the mold, which surrounds the entire matrix which is itself composed of cork and polymer. This outer layer of polymer forms a semi-transparent covering. The cork particles making up the interior of the product are arranged in a random distribution, and are aligned in random positions with respect to one another.

The structure of the outer layer depends upon the pressure exerted on the mold during heating. If the pressure is not great enough there will be open pockets on the surface, where the polymer did not flow.

In some examples, open pockets are desired, but for closures a smooth surface is desired.

The greater the pressure, the greater the compression of the cork particles, the greater the flow amoung the cork particles, and the denser the product. Likewise a greater thickness of polymer distributed on the outer portions, forming a thicker layer against the mold walls.

Following the procedures described above, the following compositions were prepared to contain the amounts of natural cork and the specified polymer. The numerical values immediately following the word "particles" after "cork" indicate the size of the natural cork particles

| | |
|---|---|
| Natural cork particles 2.0 – 4.0 mm | 100 gm. |
| Microthene FE-532 | 150 gm. |
| Natural cork particles 2.0 – 4.0 mm | 100 gm. |
| Microthene FE-532 | 200 gm. |
| Natural cork particles 2.0 – 4.0 mm | 100 gm. |
| Microthene FE-532 | 250 gm. |
| Natural cork particles 2.0 – 4.0 mm | 100 gm. |
| Microthene FE-532 | 300 gm. |
| Natural cork particles 2.0 – 4.0 mm | 100 gm. |
| Microthene FE-532 | 50 gm. |
| Natural cork particles 2.0 – 4.0 mm | 100 gm. |
| Microthene FE-532 | 20 gm. |
| Natural cork particles 2.0 – 4.0 mm | 100 gm. |
| Microthene FN-510 | 150 gm. |
| Natural cork particles 2.0 – 4.0 mm | 100 gm. |
| Microthene FN-510 | 100 gm. |
| Natural cork particles 2.0 – 4.0 mm | 100 gm. |
| Microthene FE-532 | 50 gm. |
| Microthene FN-510 | 50 gm. |
| Natural cork particles 2.0 – 4.0 mm | 100 gm. |
| Microthene FE-532 | 100 gm. |
| Microthene FN-510 | 100 gm. |
| Natural cork particles 2.0 – 4.0 mm | 150 gm. |
| Microthene FN-510 | 350 gm. |
| Natural cork particles 2.0 – 4.0 mm | 100 gm. |
| Microthene FN-510 | 200 gm. |

When the compositions of these materials were molded into bottle closures, the closures were dimensionally stable, inert to most liquids, particularly wines and other liquors, and strong enough to resist breaking apart from any action of a corkscrew. The stoppers did not dry out on standing and imparted no taste, color or odor to the liquid in the bottle. The stoppers had the appearance of natural cork.

We claim:

1. A composition for forming stoppers for bottles, containing 1 part by weight of natural cork particles and from about 0.1 to 10 parts by weight of a polymer powder composed of particles of a polymer selected from a group consisting of polyethylene, ethylene-vinyl acetate copolymer, and a mixture of the polyethylene and the ethylene-vinyl acetate copolymer, the particles of the natural cork ranging in size from about 0.2 to 10 mm.

2. A composition according to claim 1 wherein the particles of the natural cork range in size from about 2.0 to 4.0 mm.

3. A composition according to claim 2 wherein the particles of the polymer powder range in size from about 8 to 30 microns with about 1 to 5 parts by weight of the polymer powder being to 1 part by weight of natural cork particles.

4. A composition according to claim 3 wherein the polymer is polyethylene.

5. A composition according to claim 4 which contains 1 part by weight of the natural cork particles and about 2.5 parts be weight of the polymer powder.

6. A composition according to claim 4 which contains 2 parts by weight of the polymer powder and 1 part by weight of the natural cork particles.

7. A process for the preparation of a composition according to claim 2 which comprises mixing the natural cork particles with the polymer powder until the natural cork particles are substantially uniformly coated with the polymer powder and filling the spaces between the particles be adding polymer powder, natural cork particles or a mixture of the polymer powder and the natural cork particles.

8. A composition for forming stoppers for bottles, prepared according to the process of claim 7.

9. A process for forming stoppers for bottles, which comprises subjecting a composition according to claim 1 to a pressure of about 5 to 75 pounds per square inch at a temperature of about 250° to 300° C for about one half hour, cooling and removing from the mold. to 300° C for about one half hour, cooling and removing from the mold.

10. A process according to claim 9 wherein the material is heated after being placed into the mold.

11. A process according to claim 9 wherein the material is heated prior to being placed in the mold.

12. Stoppers for bottles prepared by a process according to claim 9.

13. Stoppers for bottles when prepared by a process according to claim 10.

14. Stoppers for bottles, having a composition according to claim 1.

15. Stoppers for bottles, having a composition according to claim 5.

* * * * *